July 12, 1960   H. H. P. LEMMERMAN ET AL   2,945,173
VOLTAGE REFERENCE SOURCE
Filed Dec. 4, 1956
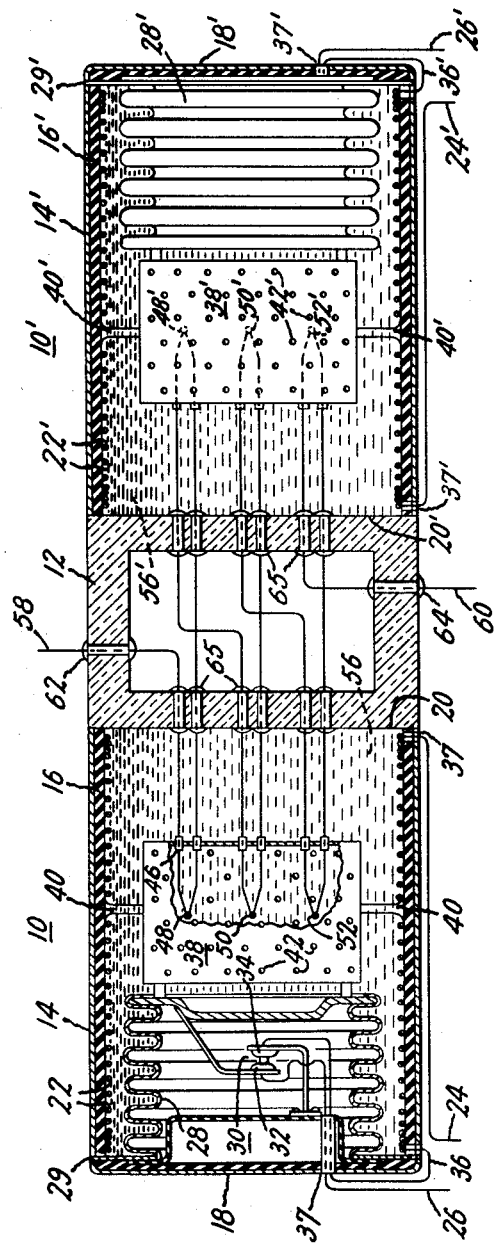
Inventors:
Weyman S. Crocker,
Harold H. P. Lemmerman,
by Roe D. McBurnett
Their Attorney.

United States Patent Office 2,945,173
Patented July 12, 1960

2,945,173

VOLTAGE REFERENCE SOURCE

Harold H. P. Lemmerman, Schenectady, and Weyman S. Crocker, Scotia, N.Y., assignors to General Electric Company, a corporation of New York Filed Dec. 4, 1956, Ser. No. 626,179

8 Claims. (Cl. 322—2)

This invention relates to a voltage reference source and, more particularly, to a voltage reference source provided by the output of a plurality of thermocouple junctions connected in pairs.

A constant voltage reference has many well-known applications. It is extremely useful in the electronics systems, especially where it is desired to compare a signal of unknown strength with a reference voltage to provide a command signal to some portion of the electronic system. Many prior art devices are known which attempt to provide a constant voltage reference for such applications. For example, an electrical method of obtaining voltage reference source from the output of a number of thermocouple junctions using vacuum tube heating means is shown in Patent No. 2,745,053 for a D.-C. Reference Source, issued to Franklin Meyer May 8, 1956.

With many of these prior art devices using thermocouple junction outputs, it is very difficult to obtain a constant voltage reference at high ambient temperatures since the equipment necessary, which may include a standard cell or some type of vacuum tube, are susceptible to high ambient temperatures. Further, such prior art devices are adversely affected by vibration and shock which greatly shorten their useful life. From this it is apparent that there is a great need for a voltage reference source which will remain constant at high ambient temperatures and which will have a long, useful life under severe vibration and shock conditions.

Some prior art devices which are not affected by vibration or shock make use of constant temperature baths in conjunction with thermocouple junctions to obtain a useful voltage reference. However, these devices are very difficult to maintain at constant temperatures and for this reason are greatly affected by any ambient temperatures.

Therefore, it is an object of this invention to provide a novel voltage reference system which will maintain a substantially constant voltage output under high ambient temperatures and will have a long life under severe shock or vibration.

A further object of this invention is to provide a new and improved voltage reference using thermocouples immersed in constant temperature baths, having a constant voltage output within very narrow limits.

A copending patent application, Serial No. 620,098, for a Temperature Control Device, filed November 2, 1956, by the present inventors and assigned to the same assignee as the present invention, discloses a novel constant temperature control device utilizing the isothermal change in volume of a substance while gaining or losing heat of fusion. The present invention employs similar constant temperature devices to maintain various groups of thermocouple junctions at substantially constant temperatures to provide an accurate rugged, long life voltage reference.

In carrying out this invention in one form, housings are provided which contain substances in a solid-liquid state, each housing having a different substance which undergoes an isothermal volume change while gaining or losing heat of fusion. The various substances undergo such isothermal volume changes at different temperatures from each other. A plurality of thermocouple junctions are immersed in each of these substances and are connected to provide a voltage output. The substances and the number and kind of thermocouple junctions are selected to provide the desired voltage reference.

This invention will be better understood when considered with the following description taken in connection with the accompanying drawing wherein there is shown a schematic diagram partially in section of one form of a voltage reference source made in accordance with the present invention.

Referring now to the drawings wherein like numerals are used to indicate like parts throughout, this invention in one form is shown as a voltage reference device comprising the units 10 and 10' each of which is maintained at a different constant temperature in a manner about to be described. It should be understood that the units 10 and 10' may be made as a single piece separated by a heat-insulated header, or they may be made in separate units which are joined together by a heat-insulated header, such as, for example, the ceramic or glass header 12. The units 10 and 10' are similar in all respects to each other with the exception that one is maintained at a different temperature than the other.

The operation of devices similar to the units 10 and 10' is fully described and claimed in the aforementioned copending application, Serial No. 620,098. The construction and operation of unit 10 will be described, it being understood that the unit 10' is constructed and operates in the same manner.

The unit 10 is a constant temperature device which comprises a housing 14. The housing 14 may be of any desired shape; for purposes of this description, it will be considered as cylindrical in form. The interior wall of cylindrical housing 14 has mounted thereon heating insulation means 16. A cap 18 is firmly attached to one end of housing 14 and is similarly provided with heat insulation means. The other end of housing 14 is shown as fixedly attached to the side 20 of ceramic or glass header 12. Heat insulating means 16 is sealed to the side 20 of header 12 to provide a substantially heat-proof seal. A heating means shown in the form of a heating coil 22 is mounted within housing 14 adjacent to the insulation means 16. Of course, it is to be understood that, if desired, the heating means could be provided exteriorly of the housing 14; however, the most efficient means is to provide the heating on the inside of the insulation 16. The heating means 22 may be in any desired form. For purposes of illustration, it is shown in the form of a heating coil with electric current being provided to its opposite ends by means of electric power leads 24 and 26, which may be connected to any source of electric current.

Mounted interiorly of housing 14 is a volume-sensitive device, being shown in the form of a metal bellows 28. The bellows 28 is mounted on a plate 29, the plate 29 being firmly attached to the housing 14, as for example, by welding. A switching means generally indicated as 30 is mounted on the inside of the bellows 28. The switching means 30 is illustrated as being provided with contacts 32 and 34 which are opened and closed by operation of the bellows 28. Lead 26, which provides electric current to one end of the heating coil 22, is connected to contact 32 of switch 30 while contact 34 is connected to the end of heating coil 22 by means of lead 36. Therefore, as the bellows 28 expands the contacts 32 and 34 are engaged, thereby energizing the heating coil 22 which provides heat to the interior of housing 14. As the bellows member 28 is depressed, the contacts 32 and 34 of switch 30 are opened, deenergizing the heating coil 22. All of the leads are taken out of housing 14 through seals 37, which may be of any desired type, for example, glass seals. The entire unit 10 may be hermetically sealed so that it is not affected by any ambient pressure changes, such as may occur at high altitudes.

Mounted within housing 14 is a thermocouple junction holder 38 which is held stationary in the housing 14 by a plurality of mounting studs 40 which are preferably of ceramic or other low heat conductive material. The thermocouple junction box or holder 38 may be of any desired shape, generally conforming to the form of housing 14. In copending application, Serial No. 626,180, filed concurrently herewith for a Thermocouple Temperature Monitor in the names of the present inventors and assigned to the same assignee as the present invention, one embodiment of holder 38 is clearly shown in Figure 2. The junction holder 38 is made of copper, aluminum, or other material having a high heat conductive property. The exterior of holder 38 is provided with a plurality of apertures 42. Mounted on one end of the junction holder 38 are a number of electric insulation beads 46. These beads provide the mounting means for the thermocouple junctions which are mounted on the interior of junction holder 38. As shown in the drawing, a number of thermocouple junctions 48, 50, 52 are shown mounted by beads 46 within the holder 38.

The interior of housing 14 is filled with a substance diagrammatically indicated by the number 56. This substance is in a solid-liquid state at the desired operating temperature of the unit 10 and is one which undergoes a large isothermal volume change while gaining or losing heat of fusion. As the substance 56 loses heat of fusion, portions of its liquid phase begin to solidify thereby shrinking in volume and allowing the bellows 28 to expand. As the bellows 28 expands, contacts 32 and 34 of switch 30 are closed thus energizing the heating coil 22 and providing heat to the substance 56. As the substance 56 begins to gain heat of fusion due to the heat of the heating coil 22, portions of the solid phase begin to liquify thereby expanding and depressing the bellows 28. As the bellows 28 is depressed, the contacts 32 and 34 are opened and the heating coil 22 is deenergized. The solid-liquid substance 56 completely surrounds the junction box or holder 38 and extends to the interior thereof through the apertures 42. By means of the substance 56 and the cyclic action of the bellows, the switch, and the heating coil, the thermocouple junctions 48, 50, and 52 are maintained at a substantially constant temperature.

The unit 10' functions in the identical manner as the unit 10, the substance indicated diagrammatically as 56' being one that is at a solid-liquid state at some temperature different than the temperature maintained by unit 10. A number of substances which undergo an isothermal volume change while gaining or losing heat of fusion are set forth in the above-mentioned copending application, Serial No. 620,098. Of course, it is understood that any substance which undergoes a large isothermal volume change during a change of state can be used for the solid-liquid substance in units 10 and 10'.

As shown in the drawing, mounted within the unit 10 are the thermocouple junctions 48, 50, and 52. These thermocouple junctions may be made of any desired metal, such as for example, chromel and constantan, palladium and iron, or even germanium, selenium, or tellurium if they are cast in protective tubes. The latter metals are a little more difficult to use in such an application but the thermoelectric powers are approximately fifty times as great as that of the ductile metals. Similarly mounted within the unit 10' are shown the thermocouple junction 48', 50', and 52'. These thermocouple junctions may also be made of any desired metal but generally being made of the same types of metals as determined by thermocouple junctions 48, 50, and 52, respectively. The thermocouple junctions 48, 50, and 52 are connected in thermocouple pairs with the thermocouple junctions 48', 50', and 52', respectively, so that a voltage output is obtained between the exterior leads 58, 60, which are shown as being brought out through seals 62, 64 in the ceramic or glass header 12. The thermocouple junction leads are brought out through seals 65 to prevent heat losses from units 10 and 10'. Obviously, since the thermocouple junctions 48', 50', and 52' are held at some temperature different than the thermocouple junctions 48, 50, and 52, their connection in thermocouple pairs will provide a voltage output as heretofore mentioned. Further, since the thermocouple junctions in each of the units 10 and 10' are maintained at a substantially constant temperature determined by the substances 56 and 56', the voltage output between the leads 58 and 60 will be maintained substantially constant.

An example of the voltage output which may be obtained from such a unit is as follows. With 100 thermocouple junctions in holders 38 and 38' and considering that the maximum ambient temperature possible to be 140° C., the compound 56 is chosen as alizarine amide (O), which melts at 150° C. The compound 56' is anthraquinone, which melts at 285° C. The differential temperature $\Delta T$ is 135° C. The thermocouple material is taken as palladium and iron. The voltage produced is given by the equation:

$$E = n[A_0 \Delta T + \tfrac{1}{2} B_0 (\Delta T)^2 \times 10^{-6}]$$

where $n =$ the number of thermocouple junctions. For palladium and iron, $A_0$ is 23.33 and $B_0$ is .0127. Therefore, the value of E obtained is $E = 0.3$ volt. The temperature error which may be expected in either control device (units 10 and 10') will be less than .1° C. Prototypes of these devices have been held to a much lower figure without overworking the switching mechanism. The error in voltage $\epsilon$ which would be generated by this temperature change is given by the differential:

$$dE = (A_0 + B_0 \Delta T) n d(\Delta T) \times 10^{-6}$$

where $\Delta T$ equals the temperature change (0.2° C.) and $\epsilon \approx A_0 n \Delta T$ $$\epsilon = 0.00043 \text{ volt}$$

Thus, it is seen that the percentage error is approximately .15% considering the above temperature error. From this, it can be seen that the invention herein disclosed will maintain a substantially constant voltage output and this output will remain constant as long as the units 10 and 10' continue to function.

Of course, it is obvious that any number of thermocouple junctions may be used. A single thermocouple junction placed in each of the units 10 and 10' and connected as a thermocouple pair to provide a voltage output would be sufficient. The number and kind of thermocouple junctions will be selected according to the use of the voltage reference. The thermocouple junctions are shown as immersed in the substance by way of illustration only. It will be obvious to those skilled in the art that as long as the thermocouple junctions are in thermal relation with the substance so as to be heated to the temperature of the substance, the desired voltage output will be obtained.

Various modifications will appear obvious to those skilled in the art. The embodiments shown are by way of example only since many substitutions may be made without departing from the spirit and scope of the invention as defined in the appended claims.

What is claimed as new and which is desired to secure by Letters Patent of the United States is:

1. A voltage reference source comprising a first thermocouple junction and a second thermocouple junction, said first and second thermocouple junctions being connected to provide a voltage output, means for heating said first thermocouple junction to one temperature and said second thermocouple junction to a different temperature, said means comprising first and second housings, said first housing containing a substance in a solid-liquid state at said one temperature and said second housing containing a substance in a solid-liquid state at said different temperature, and means for maintaining said temperatures of said substances substantially constant.

2. A voltage reference source as claimed in claim 1 in which the means for maintaining said temperatures of said substances substantially constant comprises a heating means for each said substance and a device responsive to volume changes in each said substance for controlling said heating means.

3. A voltage reference source for obtaining a substantially constant voltage reference comprising a first housing containing a first substance in a solid-liquid state, means for maintaining said substance at a substantially constant temperature, at least one thermocouple junction in thermal relation with said substance, a second housing containing a second substance in a solid-liquid state, means for maintaining said substance at a substantially constant temperature which is different from that of said first substance, at least one thermocouple junction in thermal relation with said second substance and means connecting said thermocouple junctions to provide a voltage output.

4. A voltage reference source as claimed in claim 3 in which each of said means for maintaining said substances at substantially constant temperatures comprises a heating means and a device responsive to volume changes in said substances for controlling said heating means.

5. A voltage reference source comprising a pair of housings, each housing containing a substance in solid-liquid form at a temperature different from that prevailing in the other housing, means for maintaining each said substance at a substantially constant temperature, a plurality of thermocouple junctions in thermal relation with the substance in each housing and means connecting said plurality of thermocouple junctions to provide a voltage output.

6. A voltage reference source as claimed in claim 5 in which the means for maintaining said temperatures of said substances substantially constant comprises a heating means for each said substance and a device responsive to volume changes in each said substance for controlling said heating means.

7. A voltage reference source comprising a first housing, said housing containing a first substance in a solid-liquid state, means for maintaining said first substance at a substantially constant temperature, a second housing containing a second substance in a solid-liquid state, means for maintaining said substance at a substantially constant temperature which is different from that of said first substance, a thermocouple junction holder mounted in each housing and being immersed in said substance in said housing, a plurality of thermocouple junctions contained in each holder, the plurality of thermocouple junctions in one holder being connected with the plurality of thermocouple junctions in the other holder to provide a voltage output.

8. A voltage reference source as claimed in claim 7 in which said substances in said housings undergo isothermal volume changes during gain or loss of heat of fusion and said means for maintaining each said substance at a substantially constant temperature comprises a volume-sensitive device and a heating unit controlled by said volume-sensitive device.

References Cited in the file of this patent
UNITED STATES PATENTS

| | | |
|---|---|---|
| 1,265,765 | Ferris | May 14, 1918 |
| 2,524,886 | Colander et al. | Oct. 10, 1950 |
| 2,528,377 | Maltby | Oct. 31, 1950 |
| 2,595,814 | Rich et al. | May 6, 1952 |